United States Patent
Holmes et al.

(10) Patent No.: US 7,251,077 B2
(45) Date of Patent: Jul. 31, 2007

(54) DIFFUSE REFLECTOR AND METHOD

(75) Inventors: Brian William Holmes, Middlesex (GB); Kenneth John Drinkwater, Hampshire (GB)

(73) Assignee: De La Rue International Limited, Basingstoke (GB)

( * ) Notice: Subject to any disclaimer, the term of this patent is extended or adjusted under 35 U.S.C. 154(b) by 191 days.

(21) Appl. No.: 10/415,903

(22) PCT Filed: Dec. 14, 2001
(Under 37 CFR 1.47)

(86) PCT No.: PCT/GB01/05538

§ 371 (c)(1),
(2), (4) Date: Dec. 1, 2003

(87) PCT Pub. No.: WO02/48760

PCT Pub. Date: Jun. 20, 2002

(65) Prior Publication Data

US 2004/0136038 A1    Jul. 15, 2004

(30) Foreign Application Priority Data

Dec. 15, 2000 (GB) ................... 0030675.3

(51) Int. Cl.
*G02B 5/02* (2006.01)

(52) U.S. Cl. .......................... 359/599; 359/1

(58) Field of Classification Search ................ 359/599, 359/571, 572, 574, 575, 1; 349/64, 112, 349/113
See application file for complete search history.

(56) References Cited

U.S. PATENT DOCUMENTS

| | | | |
|---|---|---|---|
| 3,580,657 A | 5/1971 | Sheridon | |
| 3,708,217 A | 1/1973 | McMahon | |
| 3,718,078 A | 2/1973 | Plummer | |
| 5,128,779 A | 7/1992 | Mallik | |
| 5,142,383 A | 8/1992 | Mallik | |
| 5,145,212 A | 9/1992 | Mallik | |
| 5,411,296 A | 5/1995 | Mallik | |
| 5,648,165 A | 7/1997 | Phillips et al. | |

(Continued)

FOREIGN PATENT DOCUMENTS

EP    0 304 194    2/1989

(Continued)

OTHER PUBLICATIONS

Trout et al., "15.3: Invited Paper: Volume Holographic Components for Display Applications", SID 00 Digest, pp. 202-205, DuPont Holograpics, Wilmington, DE.

(Continued)

*Primary Examiner*—Alessandro Amari
(74) *Attorney, Agent, or Firm*—Oliff & Berridge, PLC

(57) ABSTRACT

A diffuse reflector comprises a substrate (20) having an asymmetric, reflective, periodic surface relief microstructure formed such that, under illumination by a multiplicity of wavelengths in a plane of incidence or illumination lying along the axis of asymmetry, substantially all the said wavelengths are preferentially scattered or guided into a single, common viewing zone offset from the direction of specular reflection hereinebefore defined.

15 Claims, 14 Drawing Sheets

U.S. PATENT DOCUMENTS

| | | | |
|---|---|---|---|
| 5,663,816 A | 9/1997 | Chen et al. | |
| 5,721,630 A | 2/1998 | Horner et al. | |
| 5,796,499 A * | 8/1998 | Wenyon | 359/15 |
| 5,812,229 A | 9/1998 | Chen et al. | |
| 5,936,751 A | 8/1999 | Wenyon | |
| 5,949,558 A | 9/1999 | Psaltis et al. | |
| 6,010,751 A | 1/2000 | Shaw et al. | |
| 6,095,652 A | 8/2000 | Trayner et al. | |
| 6,291,146 B1 * | 9/2001 | Chang et al. | 430/394 |
| 6,369,919 B1 | 4/2002 | Drinkwater et al. | |
| 6,538,711 B2 * | 3/2003 | Funahata et al. | 349/113 |
| 6,573,959 B1 * | 6/2003 | Molsen | 349/113 |
| 6,608,722 B2 * | 8/2003 | Cowan et al. | 359/599 |

FOREIGN PATENT DOCUMENTS

| | | |
|---|---|---|
| EP | 0 821 293 A2 | 1/1998 |
| GB | 1 352 001 | 5/1974 |
| GB | 2 212 445 | 7/1989 |
| GB | 2 219 872 A | 12/1989 |
| GB | 2 221 550 | 2/1991 |
| GB | 2 340 281 A | 2/2000 |
| GB | 2 340281 | 2/2000 |
| WO | WO 95/12826 | 5/1995 |
| WO | WO 98/59266 | 12/1998 |
| WO | WO 00/41009 | 7/2000 |
| WO | WO 02/10803 A2 | 2/2002 |

OTHER PUBLICATIONS

Hutley, "Diffraction Gratings", National Physical Laboratory, Academic Press, 1982, pp. 34-125.

Hasegawa et al., "11.3: Reflective Stacked Crossed Guest-Host Display with a Planarized Inner Diffuser", Society for Information Display International Symposium, pp. 128-1227, Digest of Technical Papers, vol. XXXI, Long Beach Convention Center, Long Beach, California, May 16-18, 2000.

Bjelkhagen "Selected Papers on Fundamental Techniques in Holography", SPIE Milestone Series, vol. MS 171.

* cited by examiner

Weak Diffuser

Strong Diffuser

Fig. 12.
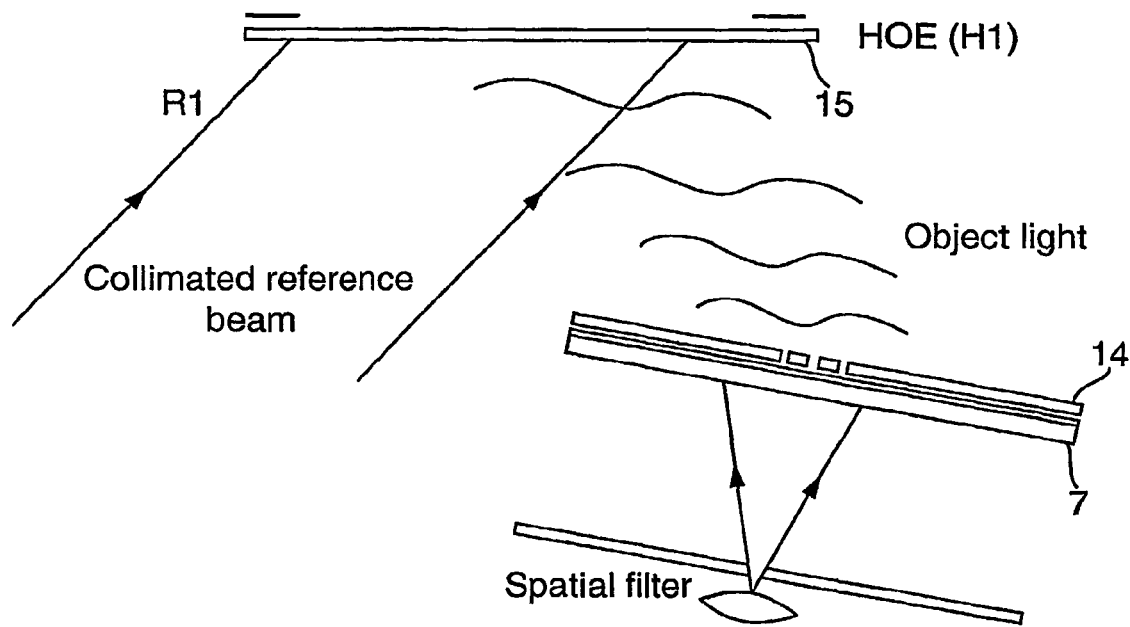
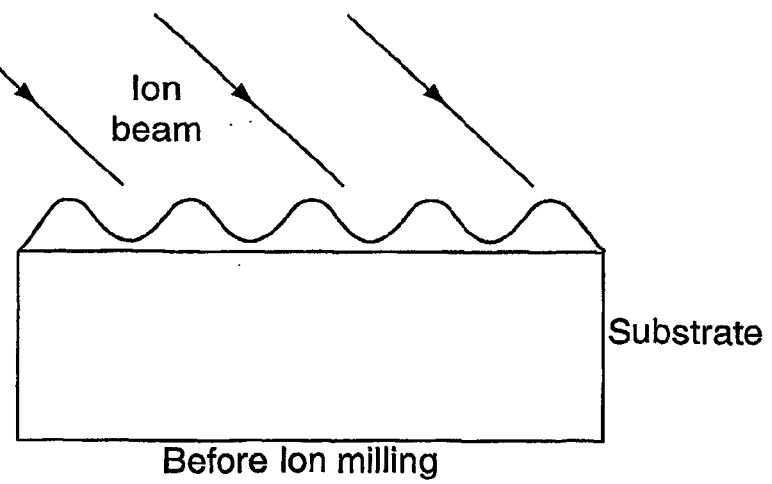
Fig. 13A.
Before Ion milling
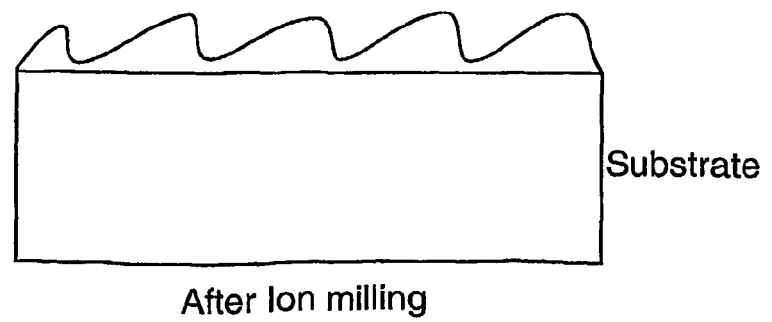
Fig. 13B.
After Ion milling

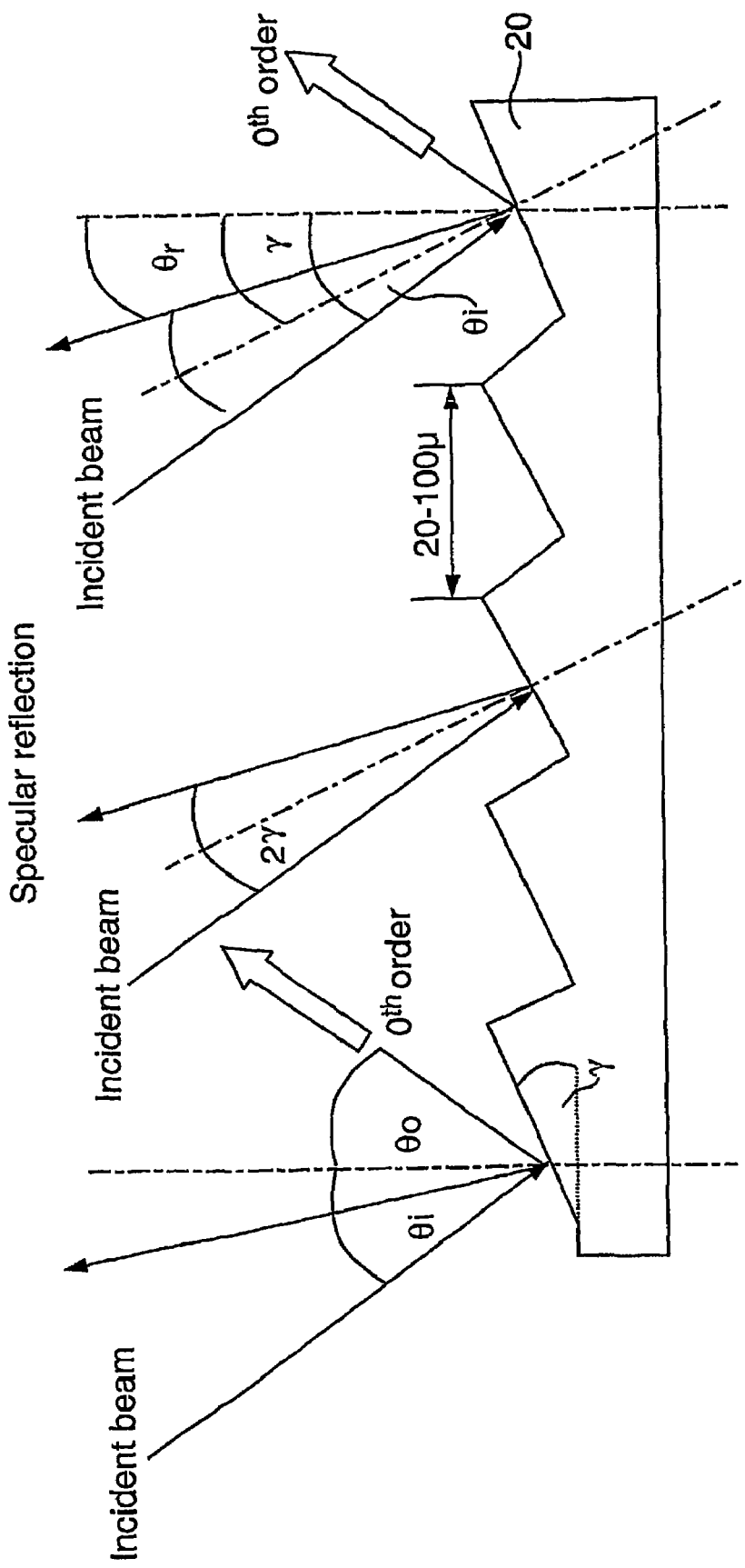

DIFFUSE REFLECTOR AND METHOD

BACKGROUND

The invention relates to diffuse reflectors, particularly for use as back reflectors. U.S. Pat. No. 5,543,958, U.S. Pat. No. 5,663,816, U.S. Pat. No. 5,745,203, U.S. Pat. No. 5,812,229, U.S. Pat. No. 5,594,560, WO 95/12826 describe liquid crystal display devices incorporating a holographic reflector as only one element. The holographic reflectors they specifically refer to are volume holograms. The diffractive principles by which they are operate (multiple Bragg reflections) are fundamentally different from a surface relief structure and the concept of blazing is irrelevant.

U.S. Pat. No. 5,936,751, U.S. Pat. No. 5,926,293 and U.S. Pat. No. 6,014,202 describe complete liquid crystal display devices of which the holographic reflector is a component. U.S. Pat. No. 5,936,751 briefly describes how the off-axis H1 to H2 process can be used to create a holographic surface relief diffuser.

There also exists an article by Kaiser Optical Systems entitled "Holographic Diffusers for LCD backlights and Projection screens" J. M. Tedesco et al, Kaiser Optical Systems, Inc., Ann Arbor, Mich., "SID 93 digest" which describes control of the direction of diffusion and the cone-angle of diffusion to meet application requirements. Specifically in WO-A-9503935, a transmissive diffusing device which both homogenizes and imparts predetermined directionality to an incident light beam through the application of a microsculpted surface is disclosed.

SUMMARY

In accordance with a first aspect of the present invention, a diffuse reflector comprises a substrate having an asymmetric, reflective, periodic surface relief microstructure formed such that, under illumination by a multiplicity of wavelengths in a plane of incidence or illumination lying along the axis of asymmetry, substantially all the said wavelengths are preferentially scattered or guided into a single, common viewing zone having an axis offset from the direction of specular reflection as hereinafter defined.

We have devised a new type of reflector which finds particular use as a back reflector, the reflector having an asymmetric structure so as to achieve preferential scattering or guiding of incident illumination into a single, common viewing zone. Typically, the viewing zone is completely offset from the specular reflection direction but some overlap is conceivable.

In some examples, a light diffusing substantially achromatic holographic reflector capable under reasonable ambient lighting conditions of back illuminating a spatial light modulator is provided, of which a liquid crystal display (LCD) is a particular example. The same structure can be used as a large format reflective screen in a front projection system (e.g. for presentations) and also as back reflector in road signs, "cats eyes" etc.

The invention enables an embossed metallised holographic reflector to be fabricated wherein the shape or profile of the surface relief is made asymmetric so as to obtain the maximum possible reflectivity from a mass manufacturable (low cost) embossed device. These asymmetric relief structures could loosely be referred to as blazed structures. The performance improvement derived from utilising an asymmetric microstructure leads to the successful widespread commercialisation of the embossed form of holographic back reflector (HBR).

Commercial applications can include any device that incorporates a thin internally back/edge illuminated flat-panel display, e.g laptop computers, cellular telephone displays, wrist watches, calculators, personal digital assistants etc. and where the back illumination represents a significant fraction of the device's power consumption. Specifically the holographic reflector provides a bright illuminating background by the holographic re-direction of the incident ambient light.

Alternatively, the diffuse reflector may be used in any (non-backlit) application where a diffuse reflector of incident light is required. In these cases the high performance of this invention confers a significant advantage. It is not necessary here for the material to be partially transparent and therefore a continuous layer of metallisation with high optical density is preferred (e.g. a transmission of <0.1%). Examples of such applications include projection screens, reflectors for road signs (including "cats eyes" etc), as a substrate for notices/advertisements or number plates (e.g. for vehicles) etc., as reflectors in lighting systems of all kinds. It may also be used as a reflective material for safety applications such as on (e.g. cyclist's) clothing/helmets or to enhance the visibility of any type of vehicle or road sign/obstruction.

The device may also be used to form a reflective substrate onto which, for example, information or graphic designs are printed. This could, for example, be as a substitute for paper, or the device could be transferred (see below) onto a paper (or other) base. Here the high. reflectivity provides strong contrast against the printed areas, which is both aesthetically pleasing and also makes the machine reading of features, such as barcodes, more efficient. Articles incorporating such a substrate could, for example, be labels, tickets, banknotes, tags, transaction cards, cheques, brand enhancement/packaging features or any document of value.

The diffuse structure could be either used supported on a polymeric carrier, or alternatively transferred from a carrier onto a final substrate using any suitable adhesive system. The adhesive system could for example be a heat-activated system, as described, for example in U.S. Pat. No. 4,728,377 and U.S. Pat. No. 4,913,504, or an adhesive that can be used at room temperature such as a pressure sensitive or cold curing adhesive. This approach is applicable to methods I and III described below.

The diffuse reflector structure may also be used in combination with other microstructural features such as holograms or other optically variable device structures, or for example with specularly reflecting areas or fully demetallised areas, each contained separately within specific areas of the device. These may then be used to form, for example, company logos or alphanumerics, barcodes etc. It is particularly advantageous to combine the components listed above because all may be formed simultaneously using the same production techniques that are used to form the back-reflector.

In this specification, as will be explained in more detail below, the term "specular reflection" refers to reflection in accordance with the law of classical reflection (angle of incidence=angle of reflection) with respect to the plane of the substrate, i.e. in the absence of a microstructure.

In preferred examples, since this enables the reflector to be used as a back reflector, the common viewing zone is centred on a direction closer to a normal to the substrate than to the plane of the substrate and most preferably is centred substantially on the normal to the substrate. In this way, when a viewer observes the reflector in a direction normal to the plane of the reflector, incident light will be reflected back towards the observer.

The substrate may itself be reflective but is preferably provided with a reflection enhancing layer such as a metallic layer or a non-metallic layer such as zinc sulphide. The reflection enhancing layer may be partially transparent, for example being provided with microholes in the case of a metallisation, to enable a back light to provide additional illumination. The microholes may be formed using any suitable demetallisation technology, of which several are known to the art, see for example U.S. Pat. No. 5,044,707 and U.S. Pat. No. 5,142,383.

Alternatively, it could be a continuous, ultra-thin (e.g. <10 nm) metallic coating, which is not opaque, and has an optical density typically within the range of 0.7 and 1.3 (corresponding to transmissions between ~20% and 5%). In this case materials that are resistant to oxidation, such as chromium, palladium or platinum are preferable to e.g. aluminium.

A variety of methods have been devised for fabricating diffuse reflectors.

In accordance with a second aspect of the present invention, a method of fabricating a diffuse reflector comprises projecting a holographic image of a diffuser on to a planar recording member oriented in the plane of the projected image while illuminating the recording member with a coherent reference beam, wherein the image and reference beam are projected on to the recording member on the same side of a normal to the plane of the recording member, to create an interference pattern in the recording member; and forming a surface relief microstructure defining an asymmetric, diffuse reflector using the interference pattern.

The recording medium is typically a plate coated with a suitable light sensitive material as well known to persons of ordinary skill in the art.

The holographic image of a diffuser may be obtained in a variety of ways. In a preferred approach, the holographic image is derived from a holographic recording of a transmissive diffuser using a reference beam which is the conjugate of the reference beam used to project the holographic image. This approach is derived from the conventional H1/H2 transfer process for producing image plane holograms and in which the first step involves recording an intermediate off-axis transmission hologram (the H1) of a transmissive diffuser, while the second step involves reconstructing the H1 to generate a real image of the diffuser located in a plane very close to the recording plate (in this case the H2) thus providing the H2 object field and allowing it to overlap with a second coherent light field which acts as the H2 reference beam to generate the desired interference pattern within the plane of the H2.

Further benefits can be achieved by integrating one or more images into the diffuser image.

In accordance with a third aspect of the present invention, a method of fabricating a diffuse reflector comprises i) fabricating a relatively coarse, asymmetric, periodic structure in a recording member; and ii) forming a diffusely scattering, finer microstructure on the periodic structure, the resultant surface relief of the recording member forming an asymmetric, diffuse reflector.

In contrast to the other methods described, this does not involve holography to generate the microstructure.

In a typical example, step (i) comprises fabricating a regular non-diffusing coarse grating with a pitch between 20 and 50 micrometers and a relief profile which is strongly asymetrised and triangulated and which may have the further attribute of being precisely blazed for wavelengths located near the centre of the visible spectrum (i.e. 550 nm), using the methods of either holographic interference or more preferably using a grating ruling engine.

Typically, between steps (i) and (ii), the coarse structure is coated with a photo responsive material, step (ii) comprising exposing the photoresponsive material to a diffuse light field. The diffuse light field may be generated directly from a diffuser or indirectly using a holographic image of a diffuser.

In accordance with a fourth aspect of the present invention, a method of fabricating a diffuse reflector comprises focussing two beams of coherent light on to a recording member through respective first and second focussing elements such that the two focussed beams overlap on the recording member, the focussing elements being designed such that the overlapping beams generate an interference pattern pixel in the recording member; repeating this process for a plurality of pixels; and forming a surface relief microstructure defining an asymmetric, diffuse reflector using the interference pattern.

Typically, both beams impinge on the recording member from the same side of a normal to the recording member. This increases the asymmetric effect.

In all cases, the asymmetric property can be further enhanced by angled reactive ion-beam milling or etching the recording medium.

The creation of the interference pattern in the recording member may itself cause the creation of a surface relief microstructure. In other cases, however, following recording of the pattern, the surface relief microstructure will be developed by suitably etching a photoresist or other photopolymer in which the interference pattern has been recorded.

A technique for achieving additional brightness is to coat the reflector with a transparent medium containing fluorescent materials. The advantage of this is that UV components of the ambient light are converted into visible light and contribute to the brightness of the screen. In cases where the microstructure is to be used attached to a polymeric carrier, the fluorescent coating may be most conveniently applied directly to the surface to be exposed to the viewer. Where it is to be applied in a transferred deposit the fluorescent material may be, overprinted (after application to the final substrate), included within an embossing lacquer, or provided as an interlayer as described in EP 0497837.

Thus, the diffuse reflector may be provided with fluorescent materials either in the embossing lacquer, the polymeric carrier, within an over-coating or coated between the microstructure and the reflection enhancing layer.

Any suitable coating process may be used for this purpose, including gravure, or flexography. Fluorescent inks may be obtained from a variety of sources such as SICPA UK Ltd., or Luminescence Inc.

The longevity of the devices may be seriously reduced by e.g. abrasive wear or aerial corrosion. Longevity may be greatly enhanced by either over-coating the microstructure with a suitable lacquer (e.g. a UV curable lacquer) or laminating the device using an adhesive to a substrate such as glass or a polymeric material.

BRIEF DESCRIPTION OF THE DRAWINGS

Some examples of diffuse reflectors and methods according to the invention will now be described and contrasted with known examples with reference to the accompanying drawings, in which:—

FIG. 12 illustrates a modified form of the method shown in FIG. 11;

FIGS. 13A and 13B illustrate a relief before and after ion beam milling;

FIG. 14 illustrates a diffuse reflector fabricated in accordance with another example of the invention;

DETAILED DESCRIPTION OF EMBODIMENTS

Background Physics

Before describing the invention in detail, it is important to have a clear understanding of the physics involved.

Figure 1:
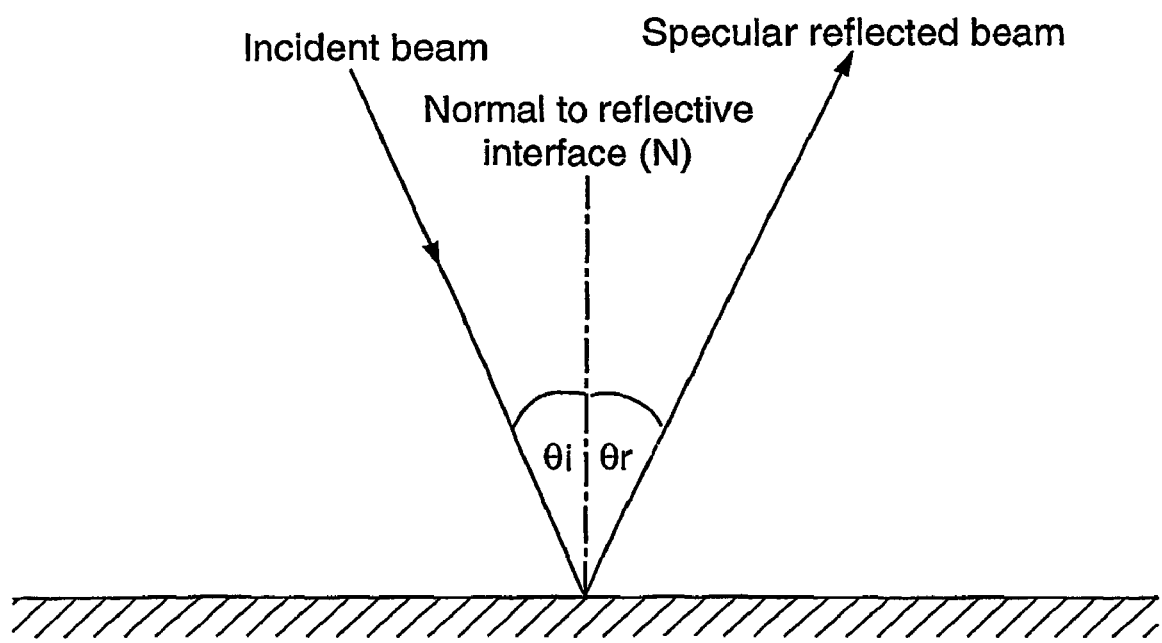
FIG. 1 illustrates specular reflection.

Whenever a beam or wavefront of light is incident upon a planar interface or boundary between two media, some fraction of the light will be scattered or redirected back into the first medium and the remaining fraction transmitted into the second medium. The former process is the phenomenon or concept of reflection in its most primitive sense. In the special case in which light is reflected off an optically smooth surface e.g. a mirror surface—here it is more appropriate to think of the light as being redirected rather than scattered backwards, with the redirection process being strictly governed by the well known classical law of geometrical reflection, which is that the angles of incidence and reflection are equal $\theta_I = \theta_r$ (FIG. 1). It should be appreciated that in classical geometrical optics the microscopic behaviour of the light-medium interaction are ignored and therefore it is implicit that the reflective interface is microscopically homogenous and devoid of structure.

Henceforth we shall refer to light rays that have been reflected according to the law of classical reflection as the specularly reflected rays or simply the specular rays, given the assumption that the angles $\theta_I$ and $\theta_r$ are defined with respect to the macroscopic plane of reflection e.g. the plane of the device and not slopes or facets on the microstructure. This provides the basis for the earlier definition of "specular reflection".

Figure 2A:
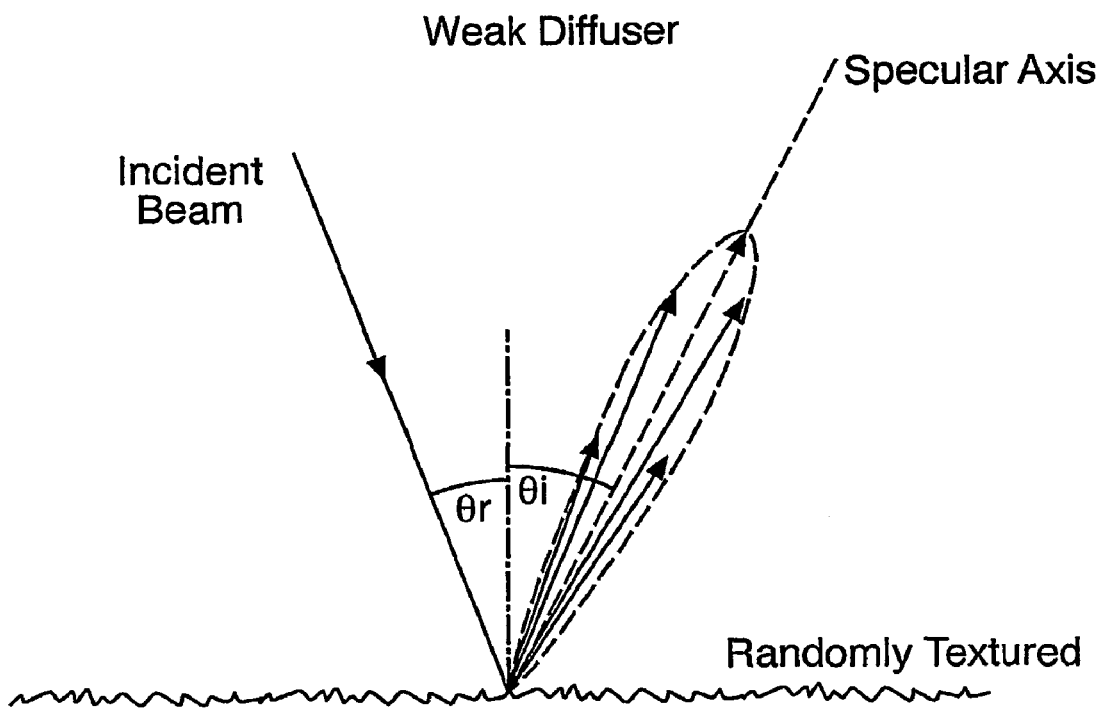
FIGS. 2A and 2B illustrate reflection from randomly textured surfaces derived from weak and strong diffusers respectively.
Figure 2B:
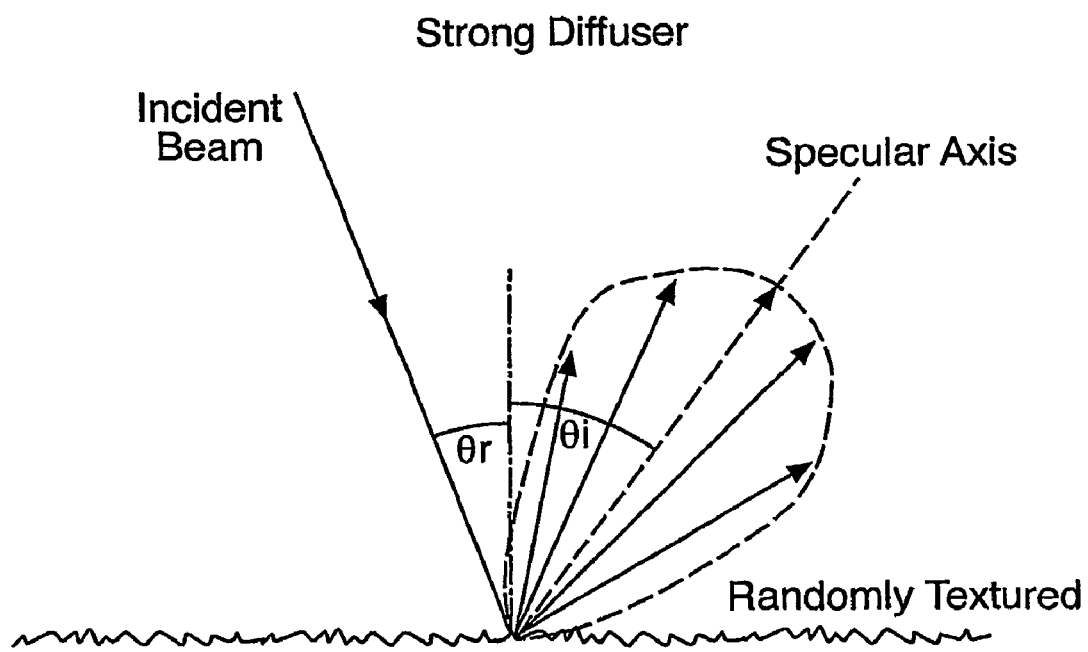

In practice, most surfaces are not optically smooth or homogenous but instead have a surface topology or structure, which on the scale of the wavelength of light is randomly textured. Consequently when a ray or beam of light impinges on such surface, it is backscattered or diffused over a wide range of angles, but centred around the direction of specular or geometric reflection as shown in FIG. 2. In FIGS. 2a and 2b, the reflected or scattered light is shown as a polar plot, wherein the relative length of each ray within the dotted envelope indicates the relative efficiency with which light or flux will be scattered in that direction. The ray that lies along the direction of specular reflection is longest, indicating that the scattering efficiency is highest in that direction and falls off in a continuous way either side at a rate determined by the nature and topology of the reflecting interface at the microscopic level.

Shown in FIGS. 2a and 2b are the polar plots for weak and strong diffusing surfaces respectively and clearly a specular surface is the idealised limiting case of a weak diffuser. Henceforth we shall classify the surfaces or devices that diffusely scatter about the axis of classical geometric or specular direction as classical Type 1 diffusers.

When quantifying the brightness of diffusely reflecting surfaces or screens it is conventional to use the term luminance (L) which represents the amount of flux or energy scattered into a unit of solid angle (steradian) per unit of subtended area (wherein the subtended unit of area is essentially to the cosine of the viewing measured with respect to the surface normal). Given this definition, a perfect type 1 diffuser is one whose luminance or perceived brightness is independent of the angle from which it is viewed—in other words it is an angularly isotropic scatterer with no preferred scattering (and therefore viewing) zone. Such diffusers are described as Lambertian diffusers as they obey Lamberts law; that is the intensity at infinity drops with the cosine of the viewing angle measured from the surface normal.

So far we have considered the reflective interface to be either optically smooth (i.e. specularly reflective) or randomly/irregularly textured (diffusely back-scattering about the direction of specular reflection). The next reflective interface that is germane to the present invention, is that in which the interface is defined by a regular periodic structure such as a grating (we ignore for simplicity the transmissive properties of this structure). The first fundamental way in which this type of reflector will differ from the preceding examples, is that its reflective properties will rotationally variable. Defining the plane of incidence to be the plane defined by the incident light beam and the surface/substrate normal then it can generally be said that the angular distribution of the scattered/redirected or diffracted light will vary not only with the angle of incidence, but also with the angle of orientation between the plane of incidence and the grating grooves. Given this, then the two most distinct geometries will be when the grating grooves are either essentially parallel to or orthogonal to the plane of incidence. It is the latter (orthogonal) geometry that is salient to this invention and will be implicitly assumed hereinafter.

Within Huygens-Fresnel model (see R S Longhurst, "Geometrical and Physical Optics", $2^{nd}$ Edition, Longman Group (London) 1967), when light impinges on the grating surface structure the resulting scattered light field is defined by superposition/interference of secondary wavelets generated by a periodically varying distribution of point sources. The resulting interference pattern is in fact what is more specifically referred to as the grating diffraction pattern.

Figure 3:
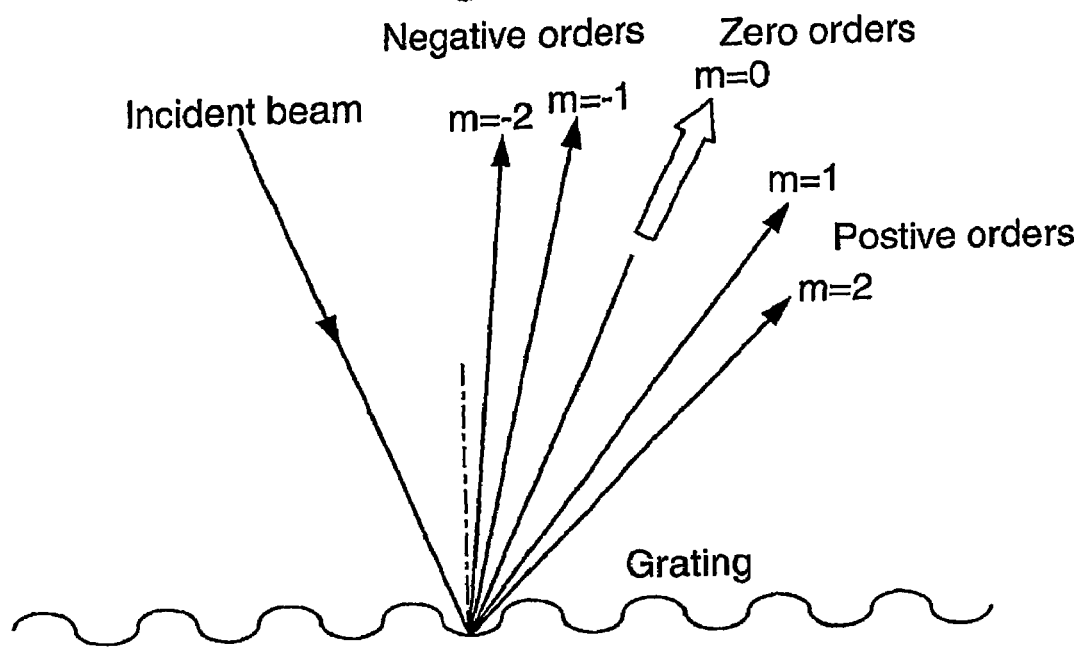
FIG. 3 illustrates diffraction from a regular periodic structure.

Typically it will have the form shown in FIG. 3 wherein, the incident light will be redirected into a number of components or orders according to the standard diffraction equation:

$$d(\sin\theta_m - \sin\theta_i) = m\lambda$$

where d is the grating pitch or periodicity and $\theta_m$ the angle the mth order makes with the interfacial or substrate normal.

Now for a grating relief structures of the type shown in FIG. 3, most of the incident light undergoes geometric or specular reflection as if from a plane mirror. It follows from the grating equation that $\theta_m = \theta_i = \theta_r$ corresponds to the zeroth order m=0, whilst the other components can be further categorised according to whether they have a positive or negative m values—these positive and negative orders being disposed either side of the zeroth order component.

Since the diffraction angle is wavelength dependent for these non-zero orders, then a beam of polychromatic incident light will not simply be redirected into discrete well defined zones but will be chromatically dispersed into rainbow bands. It is useful here to define the term spatial frequency when applied to periodic patterns or structures. Suppose the spatial period of the pattern is denoted by the symbol $\Lambda$ then the spatial frequency is simply $2\pi/\Lambda$. Now since fringe patterns, gratings etc have a directional/orientational nature as well as periodicity it is customary to define a vector quantity called the grating vector $\hat{G}$ whose magnitude is the ratio $2\pi/\Lambda$ and whose vector direction is a line that is at right angles to the orientation of the grooves.

Whilst it is more meaningful to regard a diffraction grating composed of a single spatial frequency, as reflectively redirecting (as opposed to scattering) the incident light, suppose we now consider a reflective interface or surface in which the relief structure is composed either:

a) Of a superposition of a range of periodic components of differing spatial frequencies, or b) if a superposition of periodic (or range of periodic) component(s) and a random/irregular component.

Figure 4:
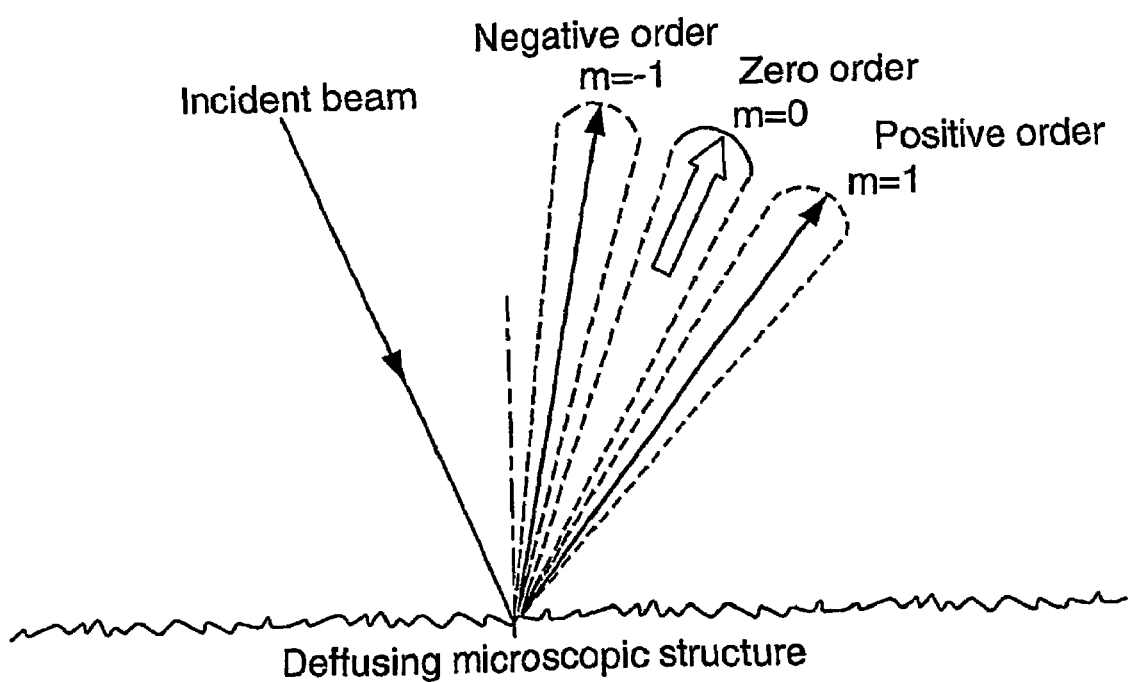
FIG. 4 illustrates diffraction from an irregular surface.

When a light beam hits such a surface it will generally be diffusely scattered into a number of discrete angular cones as shown in FIG. 4. Some percentage of the light energy will be scattered, in most cases(though there will be important exceptions) along the direction of geometric reflection in a similar way to the type I diffuse reflector—this is the zero order term when compared to a pure grating. The other angular cones of diffusion disposed about the zero order term will be the diffractive components. We shall call this type of reflector a type II diffuse reflector—when used as reflective device.

Type 1 diffusers that scatter light about the axis of geometric or specular reflection are unsuitable as back reflectors. We have devised modified type II reflectors which selectively scatter light towards the direction of orthogonal viewing (e.g. the negative order in FIG. 4). Since light that is scattered about the direction of geometrical reflection (the zeroth order) or deviated into a more oblique scattering cone (the positive order in FIG. 4) is wasted light the surface relief is modified such that it preferentially scatters light into the preferred negative/orthogonal viewing order at the expense of the other orders.

Creating an Asymmetric Structure

Figure 5:
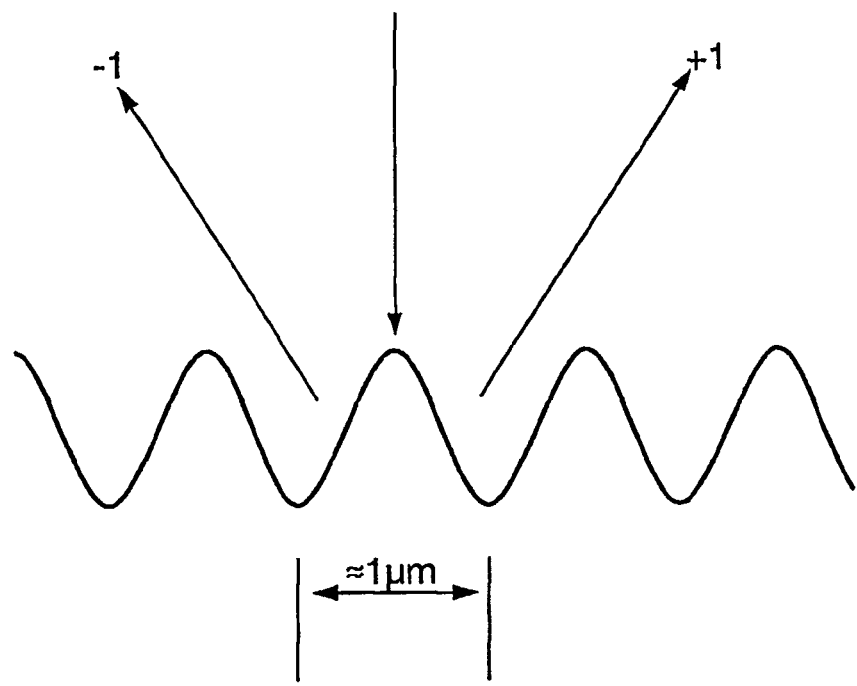
FIG. 5 illustrates a sinusoidal surface relief.
Figure 6:
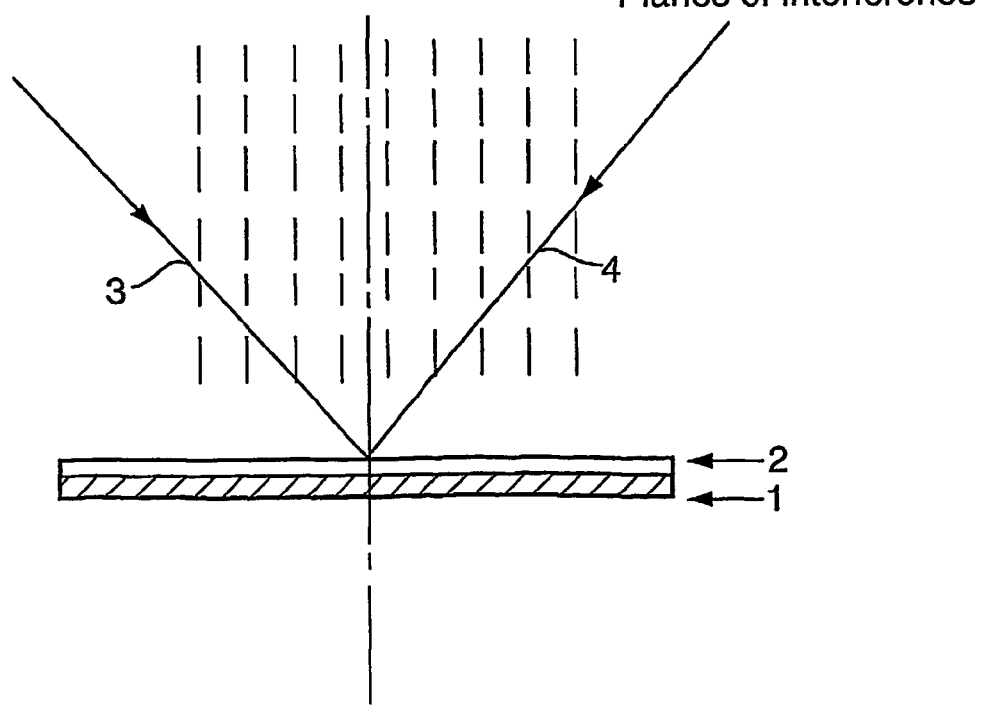
FIG. 6 illustrates a method of forming the relief of FIG. 5.

Consider first a symmetric sinusoidal surface relief pattern of pitch, say 1 micron shown in FIG. 5. Such a pattern would be created by exposing a plate 1 coated with photoresist 2 (a material that becomes soluble in aqueous alkali when exposed to UV or blue light) to the interference pattern generated by the overlap of two beams 3,4 of coherent blue laser light—with the resist substrate pointing roughly along the direction of the optical bisector for the two beams as shown in FIG. 6 (note only when the bisector is normal to the substrate will the spacing $\Lambda$ of the fringes be the same as the grating pitch d. Because of its symmetry this structure will, when illuminated by a laser beam, generate in addition to the specular or zero order beam, two first order diffractive beams of equal intensity or brightness (as well as much weaker higher orders which we will disregard).

Figure 7:
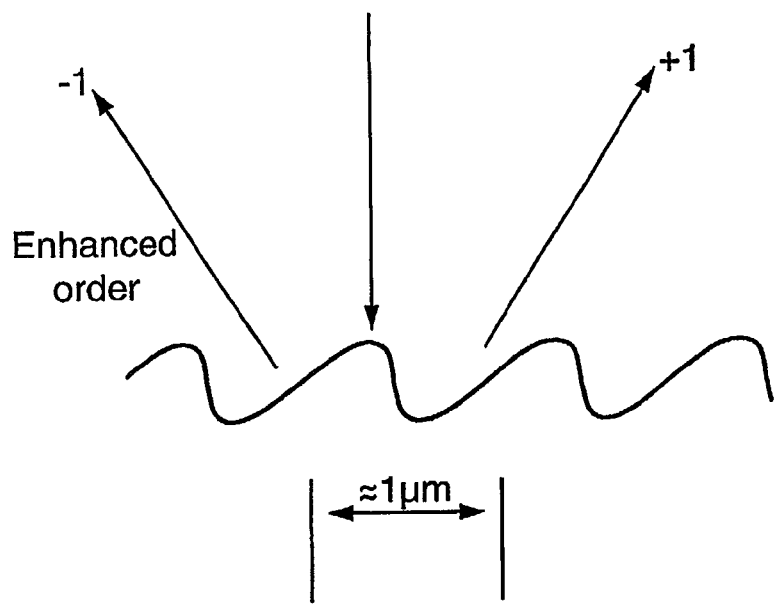
FIG. 7 illustrates an asymmetrical relief.

Consider next the asymmetric surface relief pattern shown in FIG. 7. This pattern can be created by strongly tilting the resist substrate, such that the planes of interference do not lie approximately at right angles to the plane of the photoresist coating but instead lie at an angle more tangential to the plane of the photoresist (see FIG. 8). It should be appreciated that these interference planes (alternate planes of constructive and destructive interference) will when the resist is processed, define planes of increased solubility (those regions that have been exposed to the planes of constructive light interference and therefore have had a higher exposure) and reduced solubility (regions that have been exposed to the planes of constructive interference and therefore low exposure). Therefore by using a recording geometry that tilts these alternating planes of solubility strongly away from the substrate normal we create an asymmetric surface relief.

Figure 8:
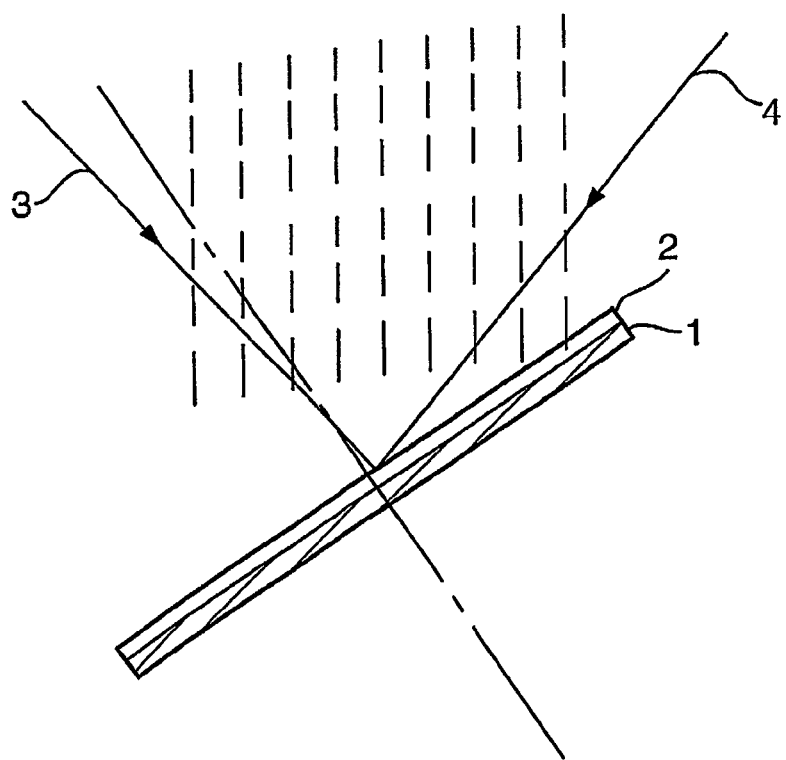
FIG. 8 illustrates a method of forming the relief of FIG. 7.

With reference to FIG. 8, we see that this requires a highly asymmetric recording geometry in which the substrate normal rather than approximately bisecting the wave-vectors for the two interfering beams instead must lie much closer to one wave-vector than the other. Indeed this asymmetry will be further enhanced if the substrate normal actually lies completely outside the angle defined by the interfering light beams or wave-vectors (although this can be difficult to achieve in practice). This relief when illuminated by a laser beam will again produce two first order diffractive beams (the plus and minus orders), however this time the diffracted order that is on the same side of the substrate normal as the elongated facet will be significantly brighter than the order that lies on the other side of the normal. This can be qualitatively understood if we think of the enhanced order as having been coherently scattered off the elongated facet (incident light interacts with larger scattering cross-section) and the weaker order as having been-scattered/diffracted off the shorter facet. The more asymmetric the profile (i.e. the greater the disparity in scattering cross-sections) the greater the fraction of available diffracted light that is redirected from the weak to the enhanced order.

For periodic relief composed of essentially one spatial frequency this enhancement can be further significantly improved by both linearising and adjusting the gradient of the elongated facet such that for a particular wavelength and angles of incidence and diffraction there is no path difference between the light rays scattered/diffracted off different parts of the facet (e.g. in phase terms the scattering interface looks homogeneous and therefore the facets behave like geometrical reflectors). This is a very important special case, in which the surface relief is said to be "Blazed" and the angle on the elongated facet is called the Blaze angle (see "Diffractions Gratings" by M C Hutley, Academic Press Ltd., 1982). In the blazed regime the angles of incidence and diffraction for the enhanced order (defined with respect to the plane of the device) are such that the light within the enhanced order can be regarded as having been geometrically reflected off the elongated linear facet. In short the blazed facets act like micro-mirrors, with scattered light energy being almost entirely concentrated in the enhanced order at the expense of all other orders including the zeroth.

Combination With Diffusion

Having discussed how, by recording an asymmetry into the microstructure for a pure diffraction grating, we can enhance the brightness of one diffracted order at the expense of the other (and the zero order) and having also outlined the geometrical requirements needed to generate the asymmetry, we next consider the situation shown in FIG. 9 in which again we have two over-lapping laser light fields 5,6. One of these light fields 5 (the first light field) is a simple collimated or spherical beam (as in FIG. 6) whereas the second light field 6 is generated by the propagation of laser light beam through a translucent diffuser 7.

Using the language of holography, we find it henceforth convenient to refer to the first light field 5 as the reference beam and the second light field 6 as the object beam. Effectively what is recorded into the photoresist through the overlap of (and therefore interference between) the object and reference beams 5,6 is an out-of-plane hologram of the object, the object in this case being the diffuser 7. Processing of the latent holographic interference pattern recorded in the resist 2 yields a surface relief microstructure much more complex and disordered than the simple dispersive diffraction grating of FIG. 6. Essentially the surface relief at any local point on the exposed part of the resist 2 will consist of a spectrum (e.g. a near continuous plurality) of periodic components each with their own grating vector $\hat{G}$ defining orientation and spatial frequency.

An analysis of the spatial frequencies present within the holographic interference pattern that generates this microstructure shows that it can be resolved into a high frequency carrier component and distributed about that carrier, a complex (information carrying) distribution of spatial frequency components that are generated by the object wavefront. We further note that every point on the recording plane of the photoresist 2 will receive light information (phase and amplitude) from all points on the diffuser 7, however at every point on the recording plane that information will be different. Some of this difference will be random and attributable to the speckle irradiance pattern, however as we move around the recording plane there will continuous and progressive changes in the composition of the microstructure both in terms of the weighted distribution of which are determined by the positional relationship between that recording point and the object (the diffusing screen). In simple terms the microstructure at every point on the diffuser screen will see a different perspective or view of the object (e.g. the diffusing screen).

Figure 10:
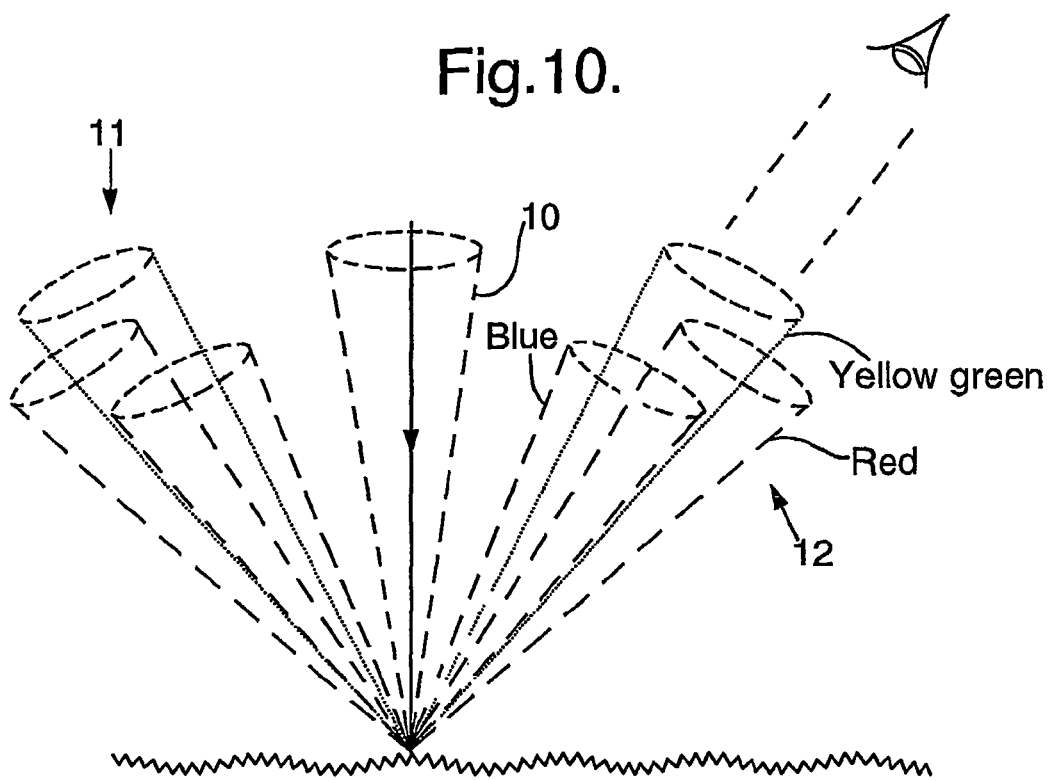
FIG. 10 illustrates the response of a diffuse relief to incident radiation.

If this holographic diffuser is vacuum coated with a white reflectance metal such as Aluminium and then illuminated normally with a narrow collimated beam of white light, the holographic replay will again consist of three visually significant components (see FIG. 10). Firstly the retro-reflective zero order component 10 which will be defined by a cone of diffuse back-scattered light which is dispersion free and therefore achromatic. Next two first order diffractive components 11,12 (i.e. the holographic images of the diffuser) which are more complex in that they contain both the effects of diffusion and dispersion. The incident white light is composed of three colour components, e.g. red, yellow-green and blue. The diffracted red component makes the biggest angle with the substrate normal and the diffracted blue component the smallest angle. However provided the cone angle of diffusion (as defined by the recording geometry) is much greater than the difference between the red and blue diffraction angles then there will be a significant overlap area of all three colours. Should the observer view the device through this holographic overlap window then the holographic diffuser will appear approximately achromatic (i.e. a greyish-white). A high level of achromaticity or whiteness crucially depends on the diffraction efficiency per steradian being very nearly the same across the visible spectrum.

Fabrication Methods

Figure 9:
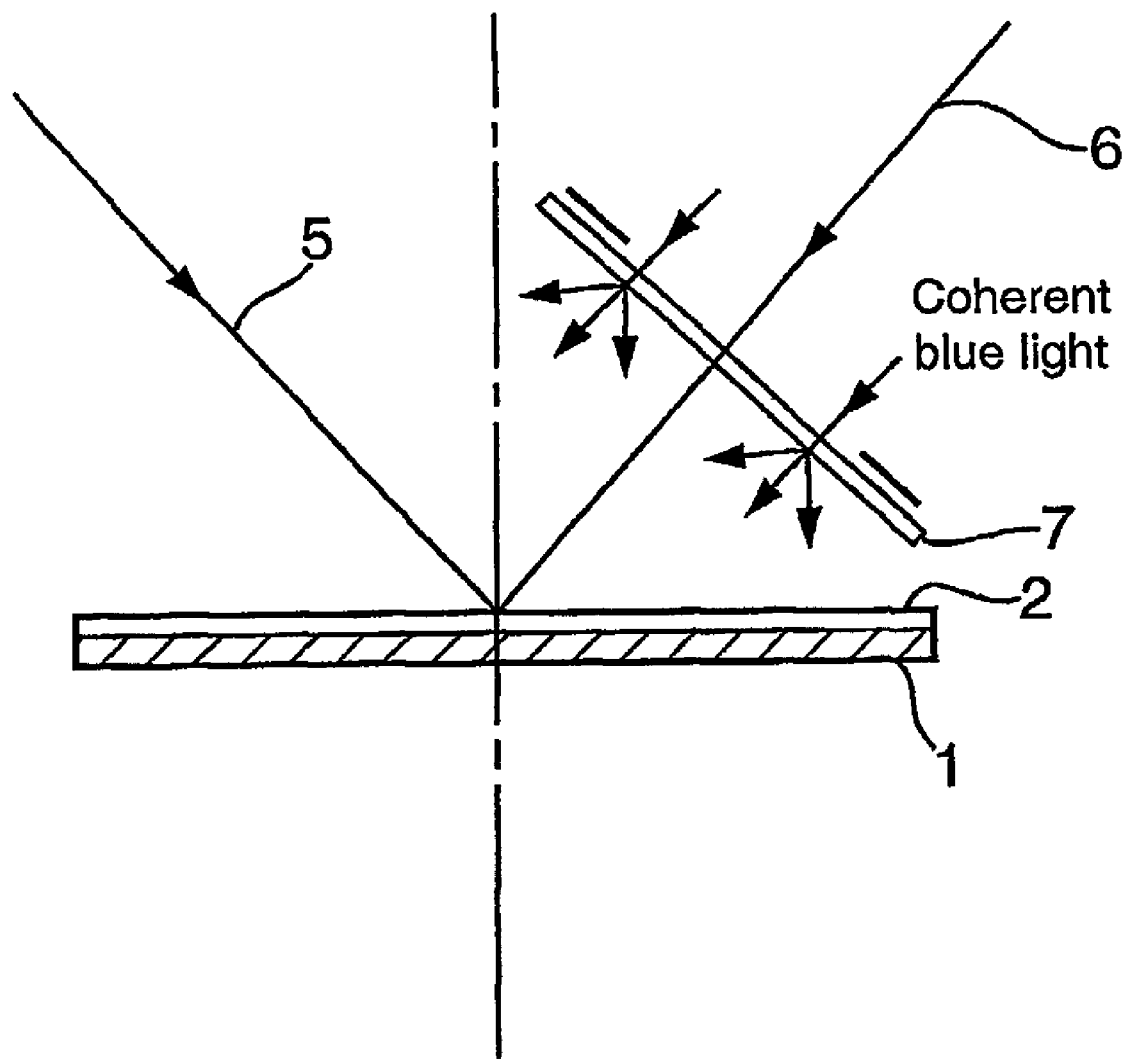
FIG. 9 illustrates a method for forming a diffuse relief.

The above discussion would suggest that we can create a high efficiency reflective diffusing screen by combining the asymmetric interference geometry of FIG. 8 into the simple holographic recording system of FIG. 9. However the resultant device would have two significant deficiencies. The first of these derives from the fact that when the resist substrate 1 is tilted so that its normal points towards the reference beam, one side of the resist 2 (which defines the top of the holographic element) will be much closer to the diffuser 7 than the other side (the bottom) and will therefore experience a brighter part of the object wavefront. The second deficiency derives from the fact that the holographic object (the diffuser 7) is located a significant distance away (more than a cm in front of the resist plane). This creates a reflective diffuser with a visibly granulated surface appearance rather than the desired appearance which is one of near unresolvably small texturing or granulation. The reason for this is that even if an optimized translucent diffuser is used, composed of minute unresolvably small scattering inhomogenities such that the near-field speckle or pattern granulations present on its surface are very small (e.g. 150 micrometers or less, on average, by the time the diverging object field reaches the surface of the photoresist 2 this speckle size will have increased to an appreciably larger and more easily resolvable size.

Method I

This method, which is derived from the well known H1 to H2 transfer process used for producing image plane security and promotional holograms, begins with the recording an off-axis transmission hologram of a transmissive diffuser (which we call the H1). This H1 contains the interference pattern generated by the overlap of the complex object wavefront generated by the diffuser and a simple reference beam (R1).

A very specialized H1 recording and transfer is now carried out, capable of creating the asymmetric (or what we may loosely refer to as blazed and triangulated) diffusing microstructure necessary to provide commercially competitive replay efficiency (i.e. brightness) and achromaticity (i.e. whiteness) when compared to much more expensive solutions based around volume holography. Also, we are able to minimise the granularity/texturing of the surface due to speckle size and secondly we are able to achieve brightness uniformity by using the transfer process to locate a holographic image of the diffuser precisely onto the plane of the resist (note it is customary to refer to the hologram recorded into the resist as the H2).

Figure 11A:
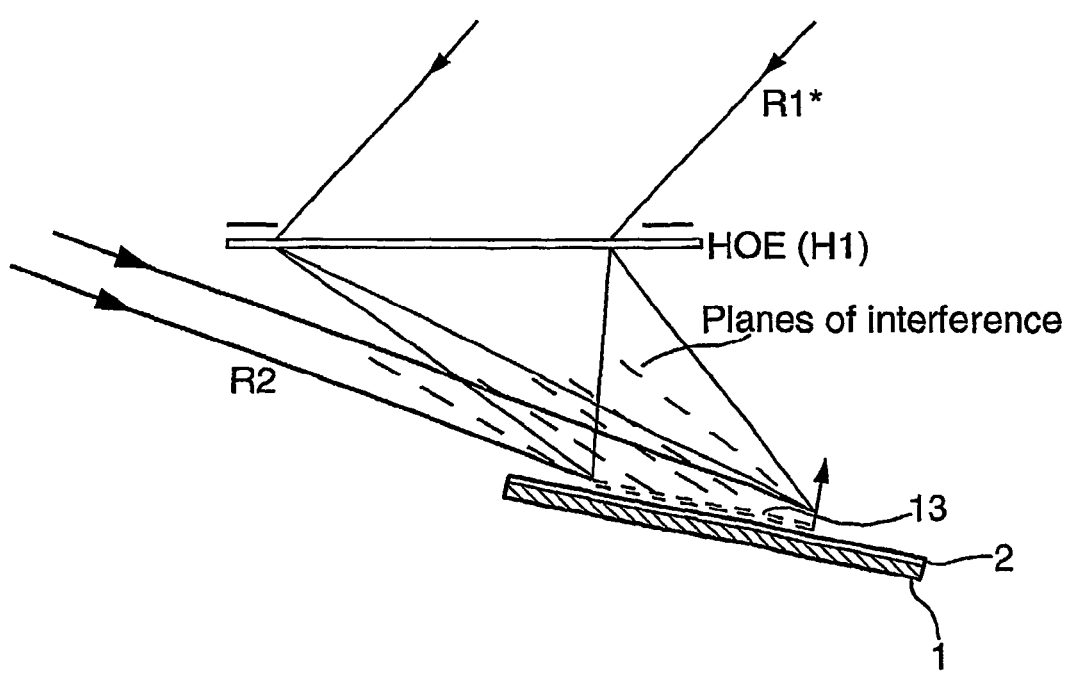
FIG. 11A illustrates a first example of a method according to the invention for fabricating a diffuse reflector.

An example of the claimed H2 recording geometry is shown schematically in FIG. 11A. It should be appreciated that because of the conjugate nature of holography, this diagram also uniquely defines the H1 recording geometry. To begin with, we illuminate the intermediate hologram (the H1) with a beam of light (R1$^+$) which is the conjugate of the reference beam (R1) used to record the H1. By virtue of the holographic process, this causes the H1 to project a holographic image of the diffuser into a plane in space 13. Next the photo-resist plate 1 is positioned such that the plane of the photo-resist plate is exactly coplanar with the holographic image 13 of the diffuser. Next a second reference beam R2 illuminates the resist 2 such that it overlaps the light field defined by the holographic image of the diffuser, thus generating the desired holographic interference pattern within the resist. Finally the photoresist 2 is processed to produce the desired surface relief. With reference to FIG. 11A, we see that the reference beam and all rays that emanate from the H1 to generate the holographic image of the diffuser object beam will be incident on the resist 2 from the same side of the substrate normal (the left hand side of the substrate normal as shown) thus generating interference fringes that are inclined to the plane of the resist across the entire image area, thus imposing an overall asymmetry in the resultant microstructure.

Now because of the very complex random/statistical nature of the holographic microstructure produced by a diffuser which is very difficult to visualize and to therefore represent diagrammatically it is important to recognize that there is considerable inventiveness in recognizing (based on the concepts of asymmetry/blazing as applied to simple and perfectly regular diffraction gratings) that one of its holographic orders can in principle actually be enhanced by an asymmetry generating recording process. Essentially, for the H2 diffuser, the microstructure at any point on its surface will be due to a superposition of interference terms: with each interference term differing in position (i.e. phase), orientation, amplitude and spatial frequency (this quantity could in practice vary by as much as three:one, i.e. from 500 lines/mm to 1500 lines/mm). Without the use of very sophisticated computer modeling it is difficult to predict or visualize the final form of the microstructure however it will clearly be much less regular than a pure diffraction grating and will differ at every point on the diffuser. Although it is known that blazed or asymmetric diffraction gratings can be produced by using a recording geometry that produces interference fringes which are tilted with respect to the substrate, it is not obvious to forget the final complexity of the diffuse microstructure (which might seem too irregular to "blaze" enhance) and identify a recording geometry that that will produce tilted interference fringes in the resist for all of the spatial frequency components.

Optionally, logos and other forms of indicia for the purposes of either brand security or enhanced decorative effect can be integrated into the diffuser screen holographic images. This can be achieved by placing graphical/artwork masks immediately in front of the diffuser. As shown in FIG. 12, a first mask in a position 14 which spatially would be completely transparent apart from defined and shaped opaque blocking areas (shaped as Logos, text etc.) would function to create voids in the diffuser 7 which are filled with the corresponding holographic imagery. Following recording with the first mask, a second mask 14, complementary to the first mask as regards it spatial transmittance characteristics, would provide the object artwork to be holographically recorded into a region of a H1 15 and subsequently-holographically transferred in (register) into the voids in the diffuser. Note the object fields for diffuser and the visual holographic image can be encoded in to the same H1 or more likely be recorded into separate H1's and transferred on to a common H2 sequentially.

Following the holographic recording and processing of this structure in photoresist (or in other forms of photopolymer that can yield a surface relief), the master H2 can then replicated as Nickel shim or Die (or any number thereof for) for subsequent embossing into a thermoplastic film or for casting into a UV curable monomer using methods well known to high volume hologram manufacturers. If greater dimensional fidelity precision is required of the replica's then injection moulding is the preferred approach.

Figure 11B:
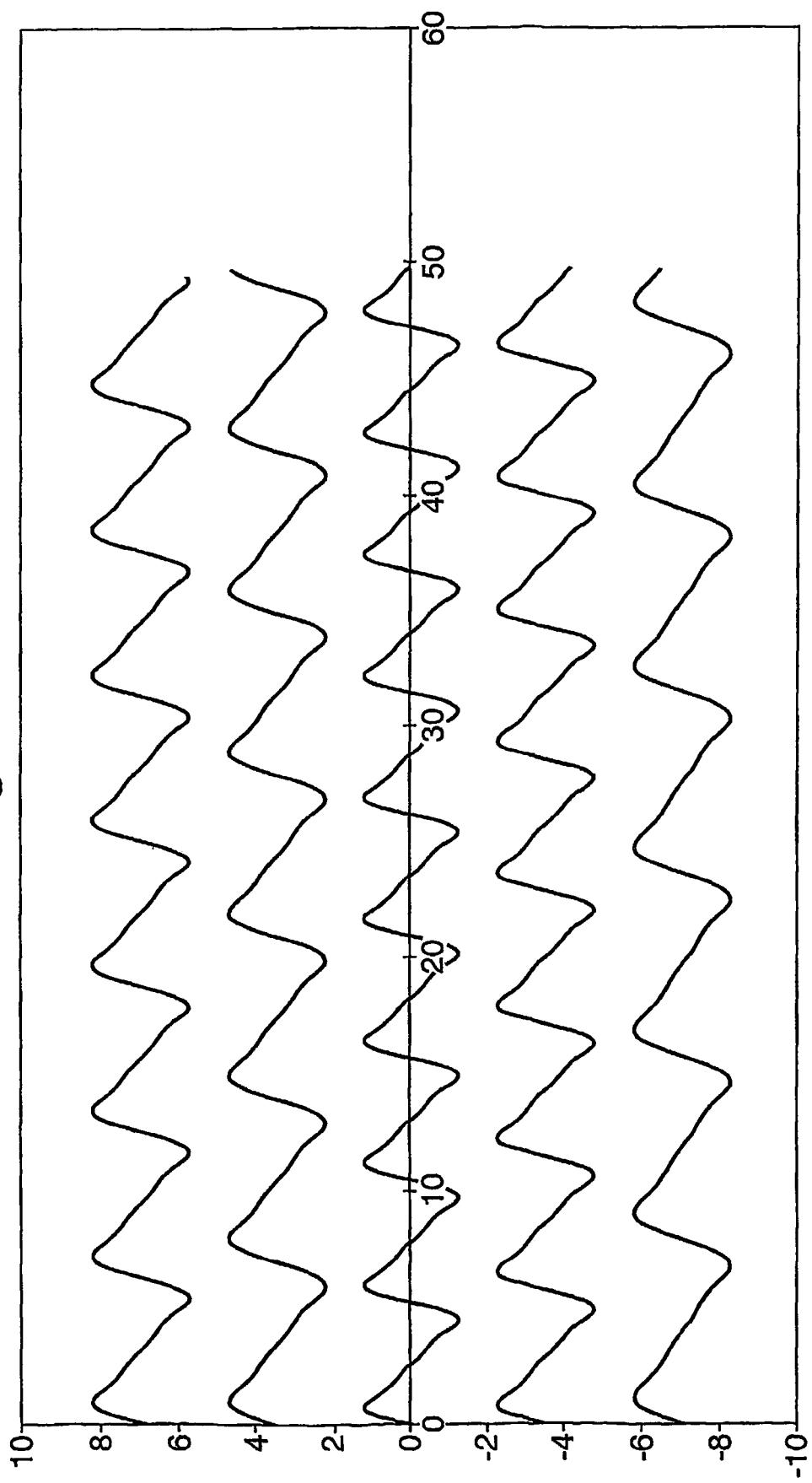
FIG. 11B illustrates five blazed gratings.
Figure 11C:
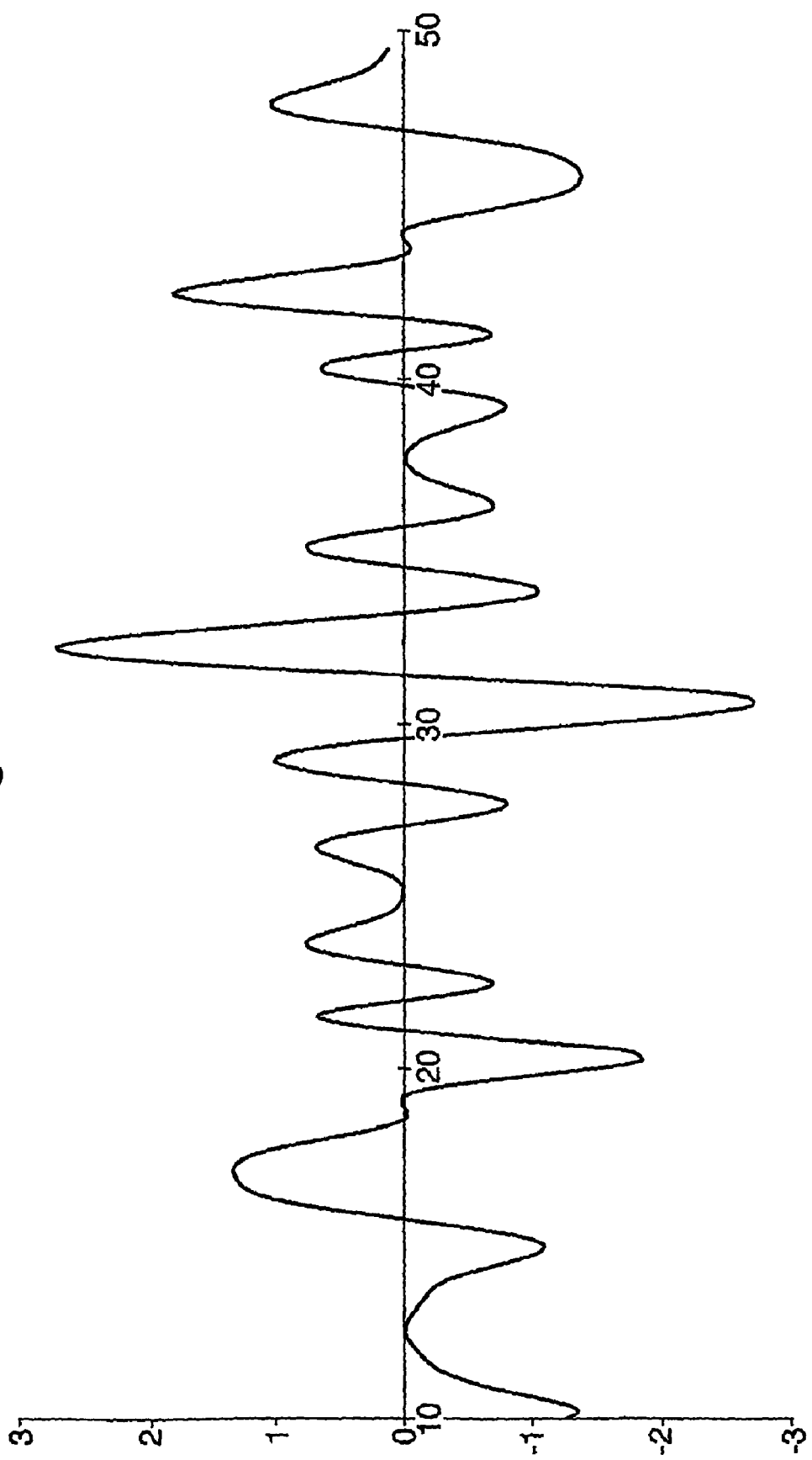
FIG. 11C illustrates the result of superposing the gratings in FIG. 11B.

The principle behind this method is exemplified in FIGS. 11B and 11C. FIG. 11B illustrates five blazed gratings, each having a different frequency and resulting from the effect of a different diffuse component. In practice, there would be many such "gratings". FIG. 11C illustrates the superposition of these gratings as they would appear in a finished product in accordance with Method I.

To further enhance the asymmetry (or triangulation/blazing) of the diffusing microstructure produced by the recording geometry of FIG. 11A (following development) and therefore increase the brightness of the desired order angled ion-beam etching or milling can be used to linearise and elongate those facets of the microstructure that face the ion-beam flux, and hence accentuate the desired asymmetry. The use of the technique of ion-beam milling to produce a well-formed triangular profile in simple pure (holographically generated) diffraction gratings of the type typically used as spectroscopic devices is known (see for example Aoyagi & Nambi, 1976: Aoyagi, Sano & Namba, 1979). However its application to complex/irregular diffusing holographic microstructure. By angling the ion beam so that its mills or dry-etches most rapidly those surfaces of the microstructure facing the incident flux has not been recorded. For illustrative purposes, FIGS. 13A and 13B show the way in which ion-beam milling would triangulate a simple quasi-sinusoidal grating.

Method II

We next describe a second approach to producing a diffuse high efficiency reflective screen, still based on the concept of asymmetric triangulated microstructure. The first stage of this process is to fabricate a coarse triangulated grating structure 20 (FIG. 14) with a pitch between 20 and 100 micrometers (depending on application) and a facet angle γ between 10 and 35 degrees and especially between 15 and 25 degrees, depending on the illumination and reflection/observation geometry e.g. application. Such a grating is most accurately fabricated using a ruling engine. Because of the coarseness of this grating structure it will have negligible dispersive power in the visible spectrum, i.e. it will appear nearly achromatic in white light. The elongate linear facets of this grating are used as geometrical reflectors or micromirrors. In the terminology of grating spectroscopy, the grating is operated in the blazed configuration and the reflected or redirected light will be a blaze enhanced high order diffractive component. This is a type II device since the reflected light is redirected way from the direction of specular reflection defined with respect to the substrate (in this case it is redirected in a direction near normal to the substrate as desired for our type II reflector).

A coarse grating of pitch 30 micrometres and therefore a facet slope of approximately 20 degrees vacuum coated with Aluminium will have the appearance of a plane mirror (with the grating structure not discernable). However unlike a plane mirror, this device will have the ability, when illuminated by a light source above and behind the observer's head to relay an image of the light source into the observer whilst the device is viewed face on (e.g. orthogonal viewing mode, with angle of incidence $\theta_i$ and therefore total angle of bend 2γ). However such a device as it stands is still unsuitable for use as a reflective viewing screen since it doesn't possess the required attribute of being able to diffusely scatter the incident light into a defined viewing zone—which depending on application may vary from as little +/−15 degrees (e.g. back-reflector in mobile phones) to +/−45 degrees (e.g. as back-reflector in lap-top LCD display or front lit projection screen) in the horizontal viewing axis. In the vertical viewing axis the upper limit on the angular viewing zone will generally be less. The next step is to superimpose onto the profile of the coarse grating a finer random structure whose average dimensions along the slope of the facets will be of the order of a few microns.

Figure 15:
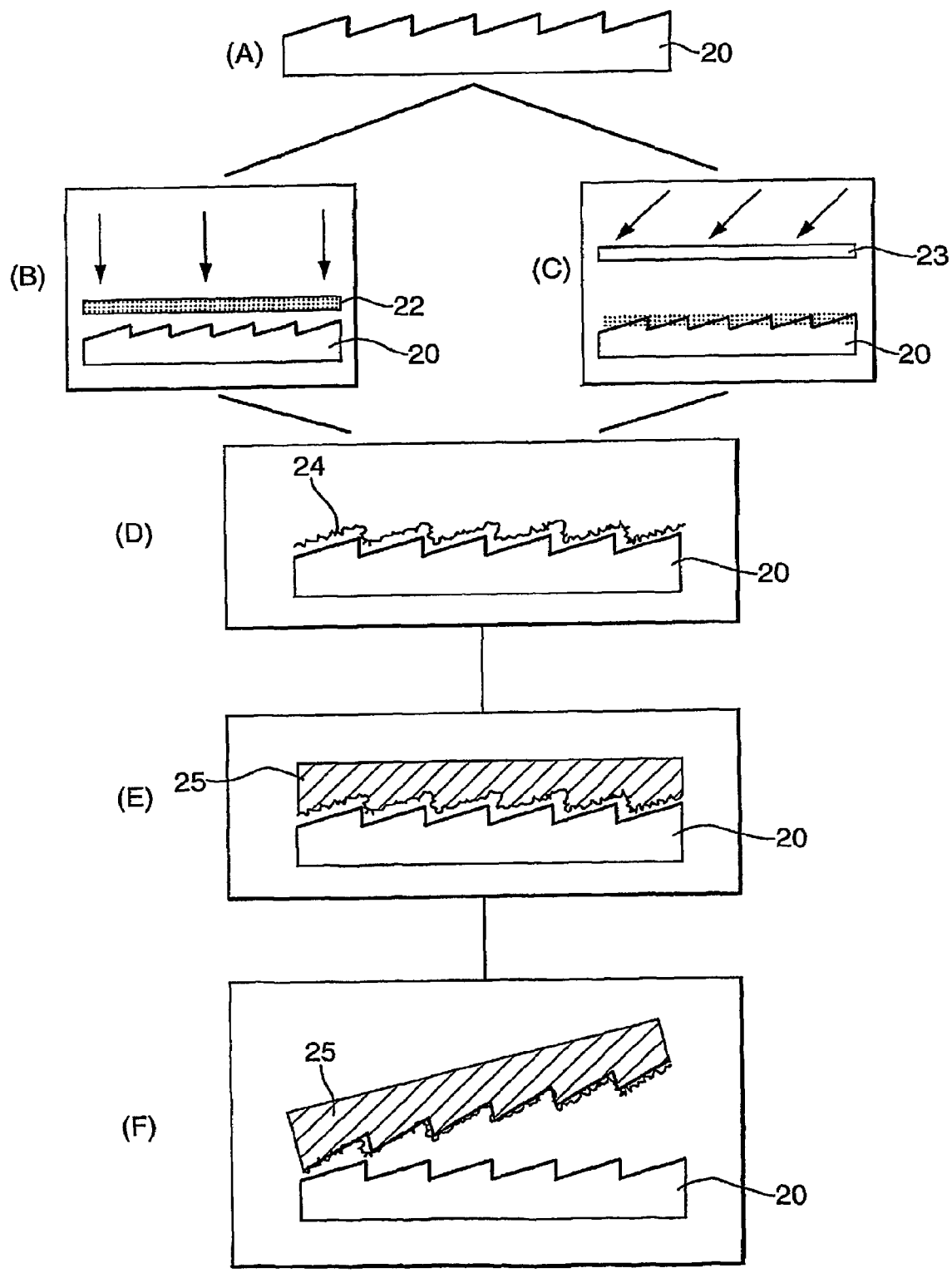
FIGS. 15A–15F illustrate successive stages in a further example of a method according to the invention.

To achieve this, the grating 20 is coated with a few microns thick layer resist 21 (FIG. 15A) using either the dip coating or spin coating process. The resist coated grating is then located in the optical light field generated either directly by a transmissive diffuser 22 (FIG. 15B) or indirectly by holographic projection from an intermediate H1 23 (FIG. 15C). Next the resist 21 is processed to produce on the exposed surface of the resist a coarse triangulated carrier grating supporting the smaller scale light scattering microstructure 24 (FIG. 15D). This surface relief is then vacuum coated with Silver and then electroplated in a Nickel Sulphate solution to produce a Nickel copy or master shim 25 (FIGS. 15E–15F) from which daughter shims or dies can be made for embossing into foil. The advantage of this coarse grating device when compared to the previous embodiments operating in the first diffractive order is that a potentially much greater replay efficiency (e.g. reflective brightness) can be achieved, in principle approaching 100%.

Method III

Figure 16:
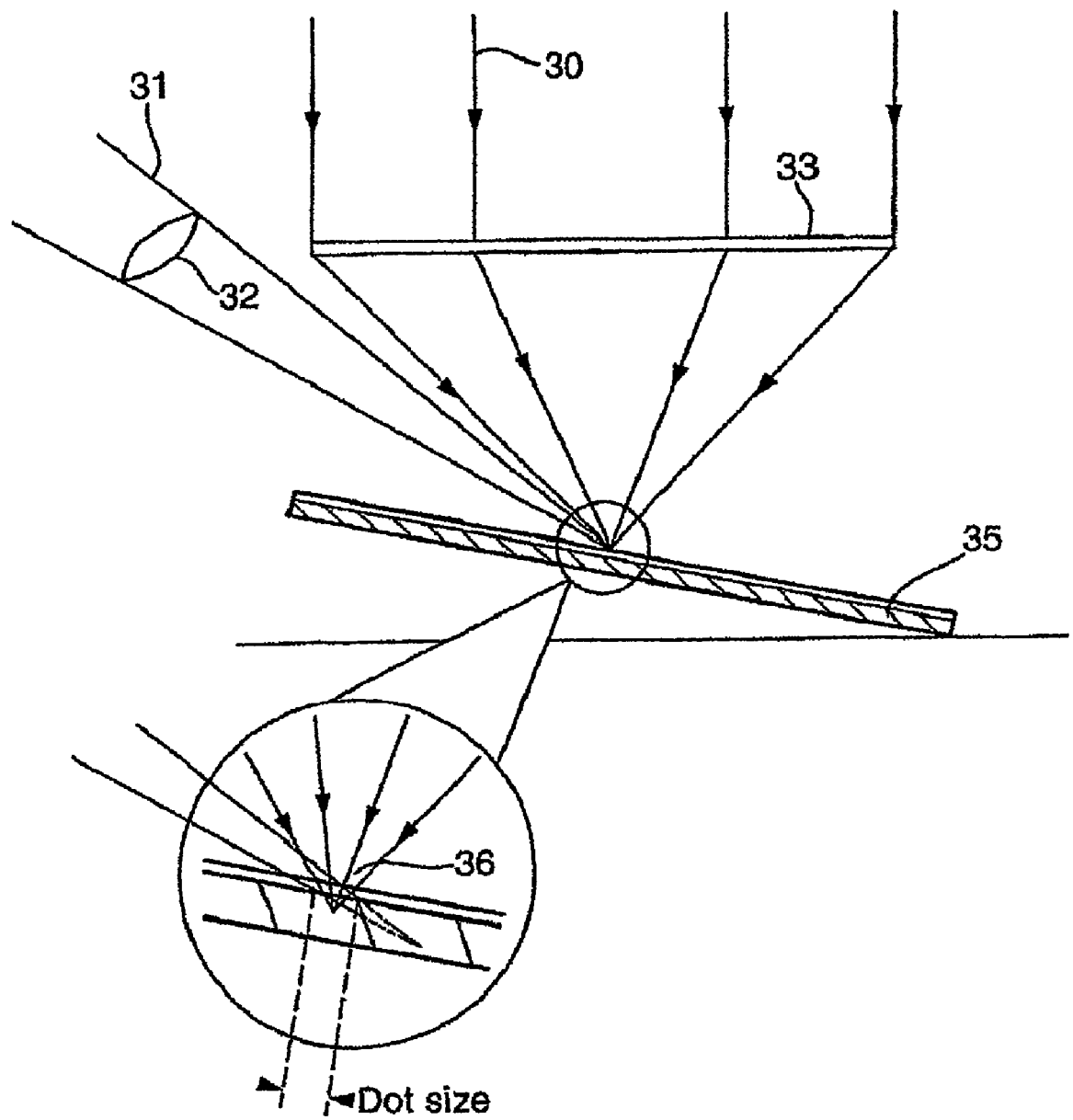
FIG. 16 illustrates yet another example of a method according to the invention; and, FIG. 17 illustrates a diffuse reflector in combination with an LCD display.

In this method, a new form of optical system for generating a close packed array of diffusing pixels and thus a reflective viewing screen is used. A schematic of the optical system is shown in FIG. 16. Essentially it depends on focussing down two distinct beams 30,31 of coherent light (of the appropriate wavelength) with focussing elements 32,33 such that they form an overlap pixel 36 (of diameter 50–100 micrometers) on the surface of the photoresist plate 35, the two beams impinging on the plate 35 substantially on the same side of a normal to the plate. Other recording media could be used such as some suitable form of photopolymer. Now one of the beams 30, which we refer to as the object beam defines the reflective scattering cone (the angular viewing window). The optical element 33 used to focus down the object light, ideally should have a low f-number (i.e. f/2 or less) thus ensuring that the diffusion/scattering angle is adequately large (i.e. greater than 20 degrees). This focussing element could be an aberration corrected lens or a holographic optical element (a H1 for example). The second beam 31, which we call the reference beam need only be weakly converging however it again needs to imaged onto the plane of the resist. Now when these two beams overlap they generate an interference pattern which is the superposition, within the limits defined by the cone angle of the convergent object beam 30, a continuous and this time coherent spectrum of spatial frequencies. The complex microstructure produced by the this superposition replays a diverging cone of light which is achromatic or white in its spectral composition. Now by the process of step-and-repeat exposure we can efficiently fill or cover the active area of the resist with these diffusing pixels thus to the unaided eye, creating a uniform area of diffusing achromatic holographic back-reflector.

As before, the brightness of one order can be further enhanced by using the process of angled ion etching to induce the desired asymmetry of the surface relief in the principal plane of dispersion.

Figure 17:
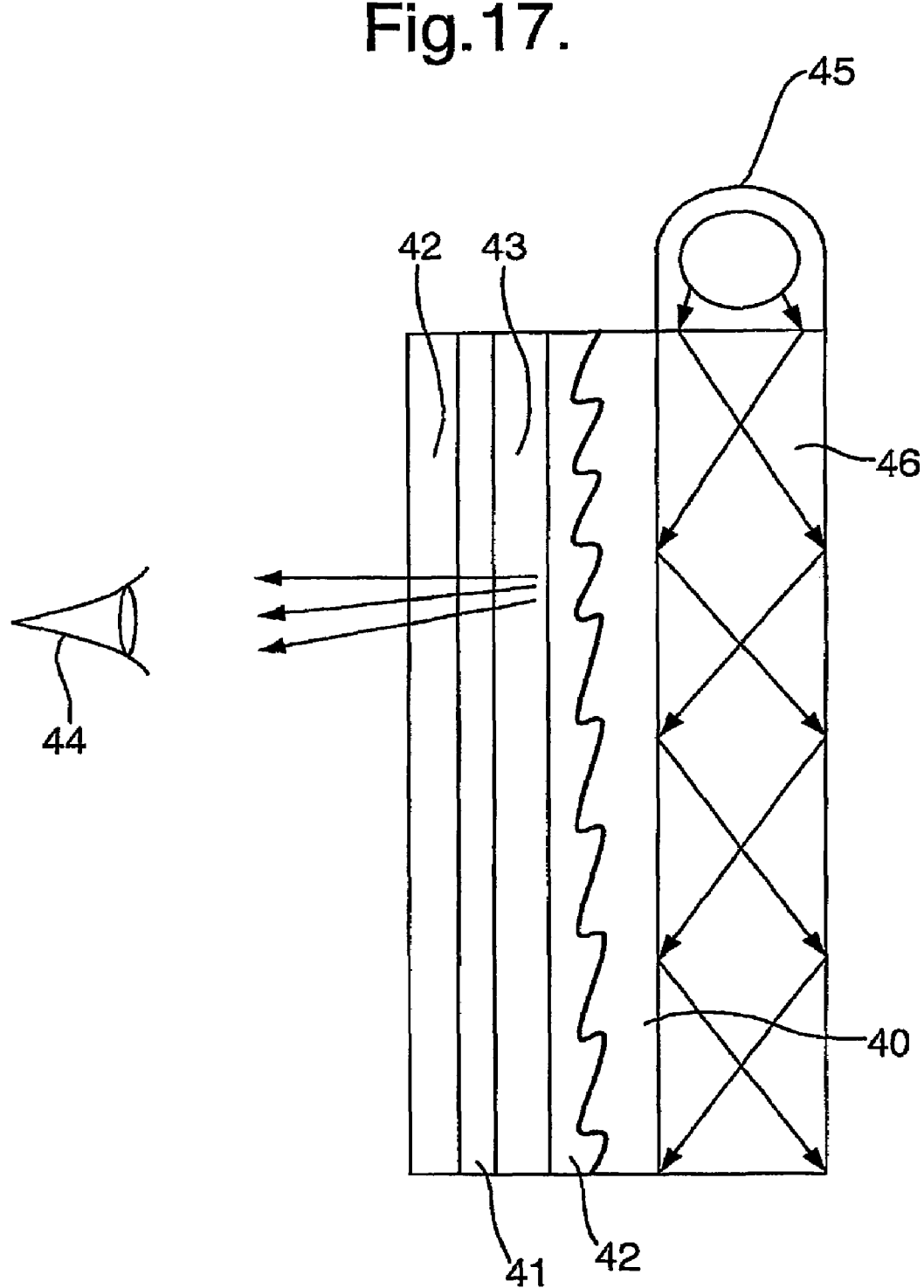

Thus far the scope of this application has been to identify novel ways of recording/fabricating asymmetric diffusely scattering surface relief microstructure (which we loosely refer to as Blazed) in order to create a high brightness diffuse back-reflector which can be volume or mass manufactured at low cost by virtue of the embossing process (rotary or flat-bed). However we would next like to focus on the practical applications of this device. FIG. 17 is a schematic diagram showing an embossed and partially metallised polyester reflector 40 (or reflective screen) laminated to the back surface of a transmissive LCD (liquid crystal display) 41 via transmissive adhesive 42. The LCD 41 is sandwiched between polarizers 42,43 in a conventional manner. Also shown schematically is the location of the observer 44. It should be noted that in this arrangement, light is viewed that is diffracted or back-scattered from the elongated (e.g. blazed facet). Now if the back-reflector has a sufficient good optical performance then in normal ambient lighting the embossed reflector 40 will back-scatter a sufficient amount light to clearly view the information present on the LCD 41. However in very subdued light it may be necessary to supplement that back reflection with some additional back-lighting which must come from behind the reflective diffuser as shown to which it is guided from a source 45 via a light guide 46. This means that the metal coating cannot be completely opaque and must transmit some fraction (5–20%) of the back-lighting illumination. These dual requirements could be achieved by coating the microstructure with a continuous semi-transparent layer of metal, however the absorption incurred in propagating a metal layer is very wasteful of back-lighting flux or energy. U.S. Pat. No. 5,926,293 describes the incorporation of light-transmissive microholes in an opaque metal coating in order to produce the small amount of absorption free transmissivity required which are generated by laser etching or ablation. We propose an alternative solution to producing transmissive holes (around 20–50 micrometers in diameter) which is very conveniently introduced as part of the rotary web to web embossing process.

This involves first continuously coating the embossed microstructure with an opaque layer of Aluminium, then printing an etchant mask using gravure or flexo roller, apply the etchant to remove the unprotected metal and then wash off. Obviously the printed mask should contain the desired micro-hole pattern however also, very importantly, it could also contain graphical features such as text, logos etc. for decorative and possibly security purposes.

Replication methods for Diffuse back-reflectors

In order to replicate the master back-reflector it can be coated with a thin layer of silver via a vacuum metalisation process which makes the surface electrically conductive. This can then be used as a cathode placed in a solution of nickel sulphamate, the anode being a basket of nickel pellets. Applying heat and a current causes nickel metal to deposit on to the silver surface of the diffuse reflector. In time a self supportive nickel layer will form which can be separated from the back-reflector. The surface profile of the nickel will be an exact, although reversed in orientation, replica of the back-reflector. Repeating this process using the nickel plate as the cathode results in a nickel replica the same orientation of the original back-reflector.

The surface relief profile of the back-reflector can be mass replicated using the nickel replica by, but not limited to, one of the following techniques:

A) Thermal Embossing in to Thermoplastics

Mounting the nickel replica on to a heated roller a suitable thermoplastic can be embossed with the surface relief profile of the back-reflector by applying heat and pressure between the rotating roller and the thermoplastic. The thermo-plastic can be either pre-metalised or metalised after embossing. The thermoplastic vehicle can either either be provided on a carrier (release or nonrelease coated) or be utilised both as carrier and relief supporting vehicle.

Polyester typically functions as a carrier layer (between 25 and 100 microns) and is coated with a suitable thermoplastic whose thickness is adequate to support the relief structure. Materials such as polypropylene and PVC (and less commonly Polyester) are suitable materials to directly emboss into, again typically 25–100 microns thick.

B) Thin Film Casting Techniques

Mounting the nickel replica on to a roller an organic monomer, which has been coated on to a suitable carrier material, i.e. 19 µm polyester, can be embossed with the surface relief profile of the back-reflector by the application of pressure between the rotating roller and the monomer coated carrier material. Once the monomer has been embossed it is then cured under UV illumination ready for full or part metalisation.

C) In-Mould Replication

The surface relief profile of the diffuse back-reflector can be incorporated in to a component of the final product by means of mould replication. This can be achieved by casting a film replica of the back-reflector surface profile. The film can then be attached to the inside wall of the components mould, such that when the component is moulded it the surface relief profile of the back-reflector will form an integral part of the component.

The invention claimed is:

1. A diffuse reflector comprising a substrate having a reflective holographic surface relief microstructure defining a first periodic component which is asymmetric about a plane perpendicular to the surface and perpendicular to the direction of periodicity, and a second diffuse component, the surface relief being formed such that, under illumination by a multiplicity of wavelengths, the illumination impinging upon the surface relief without passing through the substrate, substantially all the said wavelengths are preferentially scattered or guided due to the first component into a single, common viewing zone located about an axis extending from the substrate and offset from the direction of specular reflection, the reflected illumination being diffused due to the second component, and wherein at least the second, diffuse component has been formed in the substrate by projection from a holographic diffuser.

2. A reflector according to claim 1, wherein the common viewing zone is centred on a direction closer to a normal to the substrate than to the plane of the substrate.

3. A reflector according to claim 2, wherein the single, common viewing zone is centred substantially on the normal to the substrate.

4. A reflector according to claim 1, wherein the said wavelengths are diffracted such that the single, common viewing zone is defined by one of the two first order diffracted components.

5. A reflector according to claim 1, wherein the surface relief microstructure comprises a relatively coarse asymmetric surface relief on which is provided a finer surface relief diffuse scattering structure.

6. A reflector according to claim 1, wherein the surface relief microstructure is embossed into the substrate.

7. A display device comprising a transparent display generator; and a diffuse reflector according to claim 1.

8. A display device according to claim 7, wherein the display generator comprises a spatial light modulator.

9. A display device according to claim 7, wherein the display device constitutes safety wear, clothing, a cats eye, flat-panel display, or a substrate for a document.

10. A diffuse reflector according to claim 1, which is either adhered to a polymeric carrier film or is transferred from a carrier onto a final substrate using an adhesive system.

11. A diffuse reflector comprising a substrate having a reflective surface relief microstructure defining a first periodic component which is asymmetric about a plane perpendicular to the surface and perpendicular to the direction of periodicity, and a second diffuse component, the surface relief being formed such that, under illumination by a multiplicity of wavelengths, the illumination impinging upon the surface relief without passing through the substrate, substantially all the said wavelengths are preferentially scattered or guided due to the first component into a single, common viewing zone located about an axis extending from the substrate and offset from the direction of specular reflection, the reflected illumination being diffused due to the second component, and wherein at least the second, diffuse component has been formed in the substrate by projection from a holographic diffuser, wherein the substrate is provided with a reflection enhancing layer, and the reflection enhancing layer is provided with micro holes.

12. A reflector according to claim 11, wherein the substrate is metallised.

13. A method of fabricating a diffuse reflector, the method comprising:
 i) fabricating a first asymmetric, periodic structure in a recording member;
 ii) coating the first periodic structure with a photoresponsive material; and
 iii) forming a second diffusely scattering, finer microstructure on the first periodic structure by exposing the photoresponsive material to a light field defined by a holographic image diffuser projected from an intermediate transmission hologram, wherein, the first periodic structure is a coarse structure, and the diffuse light field is generated directly from a diffuser or indirectly using a holographic image of a diffuser.

14. A method according to claim 13, further comprising forming the intermediate transmission hologram by recording an off-axis transmission hologram of a transmissive diffuser.

15. A display device comprising a transparent display generator; and a diffuse reflector the diffuse reflector comprising a substrate having a reflective surface relief microstructure defining a first periodic component which is asymmetric about a plane perpendicular to the surface and perpendicular to the direction of periodicity, and a second diffuse component, the surface relief being formed such that, under illumination by a multiplicity of wavelengths, the illumination impinging upon the surface relief without passing through the substrate, substantially all the said wavelengths are preferentially scattered or guided due to the first component into a single, common viewing zone located about an axis extending from the substrate and offset from the direction of specular reflection, the reflected illumination being diffused due to the second component, and wherein at least the second, diffuse component has been formed in the substrate by projection from a holographic diffuser, wherein the reflection enhancing layer is partially transparent, the device further comprising a back light source for generating back light which can be transmitted through the reflection enhancing layer.

* * * * *